Patented Mar. 8, 1949

2,464,128

UNITED STATES PATENT OFFICE 2,464,128

CELLULOSE ORGANIC ACID ESTER COMPOSITIONS CONTAINING 2,2'-DIHYDROXY BENZALAZINE

William M. Gearhart and Lester W. A. Meyer, Kingsport, Tenn., assignors to Eastman Kodak Company, Rochester, N. Y., a corporation of New Jersey No Drawing. Application July 23, 1947, Serial No. 763,147

1 Claim. (Cl. 106—186)

This invention relates to cellulose organic acid ester compositions containing a fluorescing agent.

It has been known to produce fluorescent effects in cellulose ester compositions by the incorporation of anthracene or rhodamin. However, plastics containing anthracene are not very stable when subjected to weathering. Moreover, for decorative purposes it is desired to have compositions which will fluoresce in various colors.

We have discovered that cellulose organic acid ester compositions with a stable bright yellow fluorescence under ultra-violet light can be prepared by incorporating in them a small amount of 2,2'-dihydroxy benzalazine,

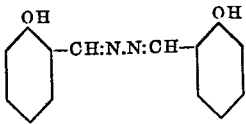

We prefer to use from 0.05 per cent to 1 per cent of 2,2'-dihydroxy benzalazine, based on the weight of the cellulose ester. Larger amounts may be used, but they begin to alter the physical properties of the plastic.

The cellulose organic acid esters which may be used in carrying out my invention include the cellulose simple esters and cellulose mixed esters of the lower fatty acids, such, for example, as cellulose acetate, cellulose propionate, cellulose butyrate, cellulose acetate-propionate, cellulose acetate-butyrate, cellulose propionate-butyrate, cellulose acetate-propionate-butyrate, etc.

If a plasticizer is to be used in the composition, the 2,2'-dihydroxy benzalazine may conveniently be incorporated into the cellulose organic acid ester composition at the same time as the plasticizer, by any desired process, e. g., by milling on hot rolls. As 2,2'-dihydroxy benzalazine is soluble in organic solvents, it may readily be incorporated in lacquers, or in spinning solutions for the manufacture of yarn. The preparation of lacquers and spinning solutions is too well known in the art to require description here.

The plasticizer which may be used in the composition forms no part of our invention. Many plasticizers for cellulose organic acid esters are known, and their selection and proportioning depend on the physical properties desired in the plastic, as is well known to those skilled in the art. A few of the commonly used plasticizers are, for example, dimethyl phthalate, diethyl phthalate, dibutyl phthalate, tripropionin, dibutyl sebacate, etc. In the manufacture of yarn, a plasticizer need not be used.

Example

By way of example, a medium soft plastic having a bright yellow fluorescence in ultraviolet light may be prepared by compounding the following components:

| | Parts |
|---|---|
| Cellulose acetate-butyrate (12% acetyl, 37% butyryl) | 100 |
| Dibutyl sebacate | 14 |
| 2,2'-dihydroxy benzalazine | 0.1 |

These components may be worked together on hot rolls, by the method described in Conklin's U. S. Patent 2,155,303.

Any of the usual lacquer ingredients, or other ingredients useful in cellulose organic acid ester compositions, may be included in the compositions involving our invention.

Products made from our fluorescent compositions, including molding plastics, lacquers, yarns, etc., have many uses. They can be used for the purposes for which they would be used without the fluorescing agent, and in addition they give beautiful decorative effects. Molded parts made from our fluorescent plastics may be used on automobile dashboards, for example. Fabrics made from yarns spun from spinning solutions containing 2,2'-dihydroxy benzalazine can be used to produce beautiful theatrical effects.

2,2'-dihydroxy benzalazine can be prepared by reacting hydrazine hydrate with salicyl aldehyde, in the manner in which benzalazine is prepared from hydrazine and benzaldehyde.

What we claim as our invention and desire to be secured by Letters Patent of the United States is:

A cellulose organic acid ester composition which fluoresces in ultra-violet light, comprising a cellulose ester selected from the group consisting of the cellulose simple esters and cellulose mixed esters of the fatty acids containing from 2 to 4 carbon atoms, and, as a fluorescing agent, from 0.05 per cent to 1 per cent, based on the weight of the cellulose ester, of 2,2'-dihydroxy benzalazine.

WILLIAM M. GEARHART.
LESTER W. A. MEYER.

REFERENCES CITED

The following references are of record in the file of this patent:

UNITED STATES PATENTS

| Number | Name | Date |
|---|---|---|
| 2,018,644 | Williams | Oct. 22, 1934 |
| 2,417,383 | Switzer | Mar. 11, 1947 |
| 2,417,384 | Switzer | Mar. 11, 1947 |